United States Patent [19]

Duurland et al.

[11] Patent Number: 4,882,637
[45] Date of Patent: Nov. 21, 1989

[54] COPYING APPARATUS FOR COPYING A MAGNETIC PATTERN FROM A MASTER MAGNETIC TAPE ON A DUPLICATE MAGNETIC TAPE AND METHOD OF OPERATING SUCH A COPYING APPARATUS

[75] Inventors: Jozef M. Duurland, Leusden; Johannes J. Roering, Soest, both of Netherlands

[73] Assignee: Polygram International Holding B.V., Baarn, Netherlands

[21] Appl. No.: 209,128

[22] Filed: Jun. 17, 1988

[30] Foreign Application Priority Data

Jun. 25, 1987 [NL] Netherlands ............... 8701477

[51] Int. Cl.⁴ ................................. G11B 5/86
[52] U.S. Cl. .......................... 360/16; 360/17
[58] Field of Search ..................... 360/15–17

[56] References Cited

U.S. PATENT DOCUMENTS

| | | | |
|---|---|---|---|
| 3,161,120 | 12/1964 | Timares et al. | 360/17 |
| 3,472,971 | 10/1969 | Van Den Berg | 360/17 |
| 3,544,732 | 12/1970 | Bauer | 360/17 |
| 3,573,390 | 4/1971 | Frost | 360/17 |
| 3,752,925 | 8/1973 | Smaler | 360/16 |
| 3,762,619 | 10/1973 | Leavitt et al. | 355/91 |
| 3,813,688 | 5/1974 | Dolby et al. | 360/17 |
| 4,698,700 | 10/1987 | Shirai | 360/16 |

Primary Examiner—Alan Faber
Assistant Examiner—Surinder Sachar

[57] ABSTRACT

A copying apparatus (1) for copying a magnetic pattern from a master magnetic tape (5) on a duplicate magnetic tape (6) comprises two facing elongate platens (9, 10) having mutually parallel gap sides (9A, 10A) which bound a gap (13). Copying means (20) are provided to promote the signal transfer from the master to the duplicate magnetic tape. In the gap sides (9A, 10A) of the platens (9, 10) passages (18) are arranged, through which passages a pressurized fluid is fed into the gap (13), so that the tapes are intimately pressed against one another inside the gap (13). In the gap sides (9A, 10A) expulsion means (16A, 10E, 10K, 23) are provided to expel air present between the tapes, the expulsion means in each gap side, in a view at the gap side, being arranged in at least one V-shape having an axis of symmetry which extends substantially parallel to the longitudinal direction of the platens (9, 10), at least a number of the passages being situated within the outline of the V-shape.

12 Claims, 6 Drawing Sheets

FIG.6

COPYING APPARATUS FOR COPYING A MAGNETIC PATTERN FROM A MASTER MAGNETIC TAPE ON A DUPLICATE MAGNETIC TAPE AND METHOD OF OPERATING SUCH A COPYING APPARATUS

BACKGROUND OF THE INVENTION

The invention relates to a copying apparatus for copying a magnetic pattern from a master magnetic tape on a duplicate magnetic tape U.S. Pat. No. 3,762,619 discloses a copying apparatus comprising two facing elongate platens having facing substantially parallel sides between which a gap having an entrance end and an exit end is situated, each platen having at least one row of passages in its gap side. Copying means promote the signal transfer from the magnetic pattern on the master magnetic tape and to the duplicate magnetic tape, transport means move the master magnetic tape and the duplicate magnetic tape through the gap in the longitudinal direction of the platens. The master magnetic tape and the duplicate magnetic tape are pressed against one another in the gap, by means of a pressurized fluid fed from the passages in the platens adjacent the two tapes into the gap. In this known apparatus two magnetic tapes are guided between two facing platens in which passages are formed through which pressurized air is fed in to form air cushions which tend to bring the two tapes in contact with one another. In particular at higher speeds of the tapes through the gap air trapped between the tapes after entry into the gap is not expelled effectively in said known apparatus, so that during the movement past the copying means the contact between the tapes is poor. This may result in a poor signal transfer to the duplicate tape and the track pattern on the duplicate tape may deviate from the pattern on the master tape.

In particular in recently proposed magnetic tape systems, such as the R-DAT audio system, it is necessary that during the signal transfer from the magnetic pattern on the master tape to the duplicate tape a comparatively high signal-transfer efficiency for short-wave-length signals is obtained and the track pattern on the master magnetic tape is transferred to the duplicate magnetic tape with an optimum accuracy.

In order to enable an acceptable copying quality to be obtained by means of the prior-art copying apparatus the speed with which the tapes are fed through the gap during duplication can be only slightly higher than the nominal speed. As a result of this, the rate of production of prerecorded duplicate tapes in this apparatus is comparatively low.

SUMMARY OF THE INVENTION

To this end the invention is characterized in that in the gap sides of the platens Expulsion means are provided in the gap sides of the platens to expel the air present between the tapes, the expulsion means in each gap side, viewed at said gap sides, being arranged in at least one V-shape between the entrance end of the gap and the copying means. The axis of symmetry of the V-shape extends substantially parallel to the longitudinal direction of the platens, and at least a plurality of the passages are situated within the outline of the V-shape. The expulsion means ensure that as the tapes move through the gap, the air initially present between the tapes is expelled at least substantially towards the tape edges in order to bring the tapes inside the gap in intimate contact with each other. The use of such expulsion means arranged in a V-shape in the gap sides, preferably at a short distance from the entrance end of the gap already provides a correct pressure build-up in the gap near the entrance end of this gap, so that immediately upon entry of the tapes into the gap the air present between the tapes is expelled uniformly from the center in a lateral direction by a kind of "ironing-out" effect, without an excessive pressure being required in the gap, which could lead to undesired effects, such as excessive noise production.

As a result of this satisfactory and uniform pressure build-up in the fluid-cushion support, which holds the tapes in intimate contact with each other, mutual displacements of the two tapes are substantially excluded. Moreover, the neutral lines of the two tapes in the gap area where the signal transfer takes place coincide. Thus even at comparatively high transport speeds the tapes can move through the gap in intimate contact with each other and without contact with the gap sides, so that short-wavelength signals are duplicated satisfactorily, the magnetic pattern transferred to the duplicate magnetic tape having a track position which is highly identical to the track position of the signals on the master magnetic tape. This is of particular advantage for magnetic-tape systems with narrow closely-spaced tracks, such as the said R-DAT system. It has been found that R-DAT tapes can be copied at a speed of transport of the tapes which is more than hundred times the nominal speed of transport of the R-DAT tape. At this high speed of transport many high-quality duplicate tapes may be produced within a very short time, which is of particular advantage in the manufacture of prerecorded magnetic-tape cassettes.

The expulsion means of each platen may have a profile which converges in a V-shape towards the entrance end and which is raised relative to the adjoining portions of the gap side, the plurality of passages being situated within the profile. The use of expulsion means having V-shaped raised profile effectively produces the "ironing-out" effect near the entrance side, so that as the tapes enter the gap the air can be expelled effectively towards the tape edges and the tapes are very soon in intimate contact with one another, even at comparatively high transport speeds.

The expulsion means of each platen may comprise grooves which converge in a V-shape towards the entrance end, the passages terminating in the bottoms of the grooves. Expulsion means having grooves converging in a V-shape near the entrance ends also provide a correct local pressure build-up of the fluid in the gap, producing the "ironing-out" effect.

The expulsion means of each platen may comprise two rows of passages, which two rows converge in a V-shape towards the entrance end. Expulsion means comprising rows of closely spaced passages arranged in a V-shape pattern also provide the "ironing-out" effect.

The expulsion means of each platen may be arranged as a plurality of V-shapes situated after one another in the longitudinal direction of the platens. The use of expulsion means comprising a plurality of V-shapes provides an even better expulsion of air trapped between the tapes.

A groove which extends in the longitudinal direction of the platen may be formed in the raised profile and passages terminate in the bottom of the groove, which groove extends across V-shapes which are situated after one another. This ensures that the pressure gradient across the V-shapes is maintained and it enables the length of the platens to be comparatively short.

The groove may form part of a plurality of first grooves which, like the V-shape, are situated within an area of the gap side, which area has a width smaller than the width of the tape, mutually spaced passages terminating in the bottoms over the entire length of the first grooves and the passages in the gap sides being arranged in facing pairs. This arrangement of the first grooves and the V-shape in the gap sides within the width dimension of the tapes results in the fluid-cushion support providing a certain automatic position correction for the tapes. In this respect it is important that the passages are arranged in facing pairs, so that the tapes move rectilinearly through the gap without contact with the gap sides.

Second grooves may be formed in each gap side and extend substantially perpendicularly to the first grooves, passages being situated at the junctions between the first and the second grooves. Providing the platens with first and second grooves which extend perpendicularly to one another and having passages at the groove junctions results in a satisfactory pressure distribution in the fluid-cushion support in the gap between the platens, enabling a substantially equal pressure to be maintained on both sides of the tapes, which is important in order to ensure that the tapes move rectilinearly through the gap.

The copying means may include a copying element having one end face terminating in the gap side of one of the platens, and situated so that the bounding edges of the end face are spaced at substantially equal distances from the respective adjacent first grooves. Such a substantially symmetrical arrangement of the copying element in the gap sides of one of the platens does not disturb the pressure build-up in the fluid-cushion support, so that the tape motion is not affected by the copying element.

The end face of the copying element may have an end wall with grooves adjoining the grooves in the associated platen. The end wall with grooves adjoining the other grooves has no effect at all on the pressure build-up on both sides of the tapes and is therefore very advantageous for a most accurate tape motion through the gaps.

The copying means may further include an auxiliary element terminating in the gap side of the other platen, the end face of the auxiliary element facing the end face of the copying element and an end wall being formed with grooves adjoining the grooves in the associated platen. Such an auxiliary element whose end face is situated in the platen opposite the copying element may yield an even better signal transfer from the master tape to the duplicate tape. The arrangement opposite the end face of the copying element ensures that the end face of the auxiliary element is also arranged symmetrically relative to the adjacent first grooves, so that the pressure build-up cannot be disturbed by the auxiliary element.

On opposite sides of the gap-side part provided with grooves the gap side of each platen may be formed with vent grooves which extend parallel to the direction of movement of the tapes through the gap. In comparison with the passages in the platens said vent grooves have such cross-sectional dimensions that the laterally escaping fluid can be discharged effectively, which is advantageous in order to preclude turbulence and to sustain a uniform pressure distribution in the fluid-cushion support inside the gap. It is to be noted that the dimensions of the vent grooves are suitably not too large in order to maintain an adequate fluid pressure.

The platens may have bridge portions which at least locally bridge the vent grooves and which each adjoin the adjacent surface of the gap side of the associated platen. The presence of the bridge portions ensures the vent grooves do not impair insertion of the tapes into the gap. When the tape transport begins the tapes will rapidly assume the correct position after the pressure build-up in the gap has started. Thus, the copying process can be started rapidly and easily.

The invention further relates to a method of operating such a copying apparatus. To this end the invention is characterized in that immediately after entering the gap the expulsion means press the tapes against each other, initially at the center and subsequently to a gradually increasing extent across the entire width, so that during the movement through the gap air present between the tapes is pressed at least substantially towards the tape edges and is expelled.

BRIEF DESCRIPTION OF THE DRAWING

FIG. 1 is a diagrammatic plan view of the copying apparatus in accordance with the invention, in which

FIG. 3A is an enlarged-scale perspective view, showing the first and second grooves in one of the platens of FIG. 3.

DETAILED DESCRIPTION OF THE PREFERRED EMODIMENT

Figure 1:
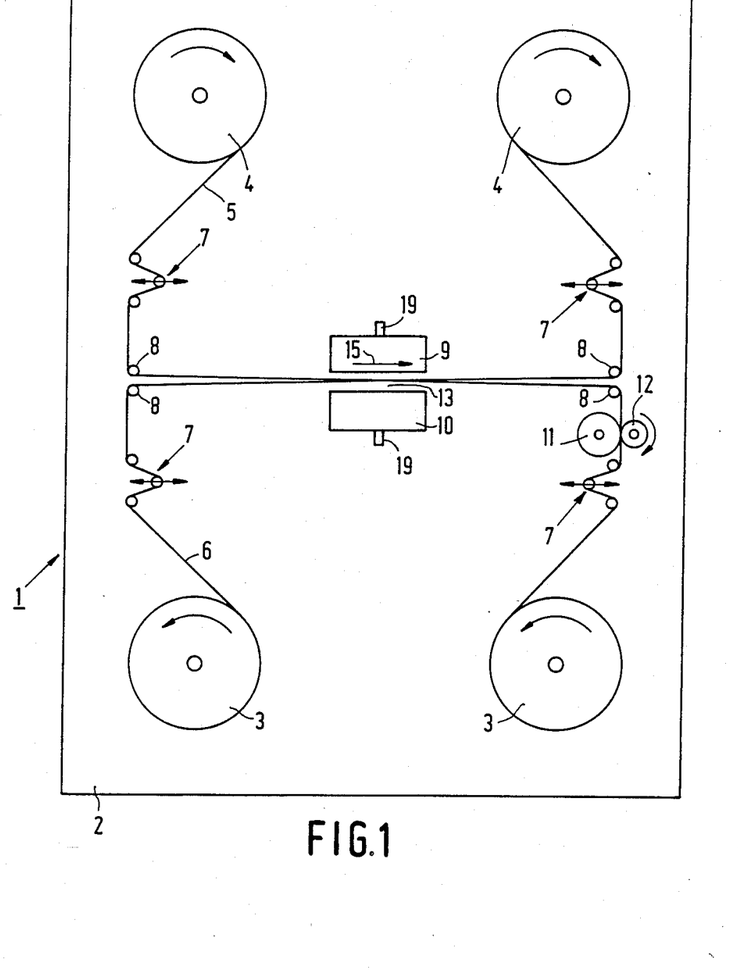

FIG. 1 is a diagrammatic view of a copying apparatus 1 comprising a deck plate 2 on which two pairs of tape reels 3 and 4 are rotatably supported. The upper pair of tape reels 4 contains a length of master tape 5 which is fed from the left-hand to the right-hand reel 4. A duplicate magnetic tape 6 is wound on the reels 3. The tapes 5 and 6 are guided over tape-tension controls 7 which ensure that the tapes are sufficiently taut, further tape guides 8 being arranged in the deck plate 2 in an area at substantially equal distances from the tape reels 3 and 4. Thus, as is illustrated, the tapes 5 and 6 between the tape guides 8 are moved in the proximity of each other as the reels rotate. The tapes then move between two mutually parallel platens 9 and 10, to be described in more detail hereinafter with reference to FIG. 2. In the area between the platens 9 and 10 the tapes are in intimate contact with each other. Therefore, it is adequate to drive only the duplicate magnetic tape 6 by means of a pressure roller 11 and a capstan 12, because as a result of the contact of the two tapes the master magnetic tape 5 is also moved between the platens 9 and 10. The transport speeds of the magnetic tapes are determined by the speed of the capstan 12. This transport speed can be adjusted as desired, so that the copying apparatus 1 can operate at any desired speed.

Figure 2:
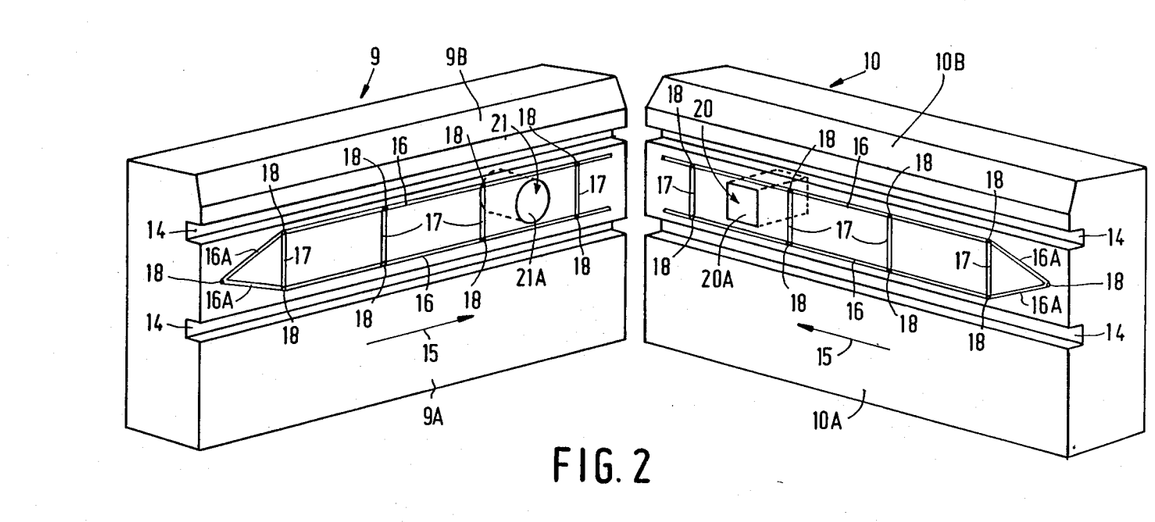
FIG. 2 is an enlarged-scale perspective view of the two platens in FIG. 1, the two platens being shown rotated out of the operating position.

As is illustrated in FIG. 2, the two platens 9 and 10 are substantially mirror-symmetrical, so that hereinafter in some instances only the construction of the platen 10 will be described. This platen comprises a profiled block of material of at least substantially rectangular cross-section. Between the platens 9 and 10 a gap 13 is formed through which the two tapes are moved, which gap is bounded at opposite sides by gap sides formed by the sides 9A and 10A of the platens 9 and 10 respectively. The gap side 10A adjoins a bevelled upper edge 10B. Similarly, the platen 9 has a bevelled upper edge 9B. The two upper edges 9B and 10B facilitate insertion of the tapes into the gap 13. For the purpose of insertion the platens 9 and 10 may be moved apart in a manner not shown. In the gap side 10A two vent grooves 14 are formed, which extend over the entire length of the platen parallel to the direction of movement of the tapes through the gap 13, as is indicated by the arrow 15 in FIG. 1. Between the vent grooves 14 in the gap side 10A a plurality of grooves are formed, comprising first grooves 16 and second grooves 17 which subtend an angle with and preferably extend perpendicularly to said first grooves. The first grooves 16 extend substantially parallel to the arrow 15 towards the entrance end of the gap side, where the first grooves adjoin the grooves 16A which converge in a V-shape. The V-shape of the grooves 16A has an axis of symmetry which extends parallel to the arrow 15. The grooves are thus arranged symmetrically relative to the vent grooves 14, and a groove 17 extends between the ends of the grooves 16A. In the grooves 16 passages 18 are formed at the junctions between the grooves 16 and the grooves 17. Another passage 18 is formed at the junction of the grooves 16A with each other. The passages 18, which terminate in the bottoms of the grooves 16, are arranged in facing pairs in the gap sides 9A and 10A of the two platens. The openings 18 in each platen communicate with an inlet port 19 in a manner not shown via the interior of the platen, which port in a manner not shown is connected to a line through which a pressurized fluid such as air is fed to the passages 18. For this purpose the apparatus comprises pressure means, not shown, such as an air pump, which supplies the air under a certain pressure.

Further, copying means are arranged in the platens, which means comprise a copying element 20 in the platen 10 and an auxiliary element 21 in the platen 9. These copying means are shown only diagrammatically and each comprise an end wall, 20A and 21A respectively, terminating in the gap side of the platen and arranged at substantially equal distances from the adjacent grooves 16. As a result of this, the end walls 20A and 21A are also situated directly opposite one another in the platens. The end walls may comprise, for example, a glass plate whose surface which faces the gap 13 are flush with the adjoining surface of the gap side of the platen. The copying element 20 is constructed, for example, as a block in which a magnetic head is arranged to produce a magnetic field in the gap 13. This field is sustained by the presence of the auxiliary element 21 which is made, for example, of a suitable ferromagnetic material. Instead of a copying element which operates with anhysteresis, i.e. via a magnetic field, it is possible to construct the copying element, in a manner not shown, as a laser. Another alternative is to construct the copying element 20 as a thermally operating element.

After the tapes 5 and 6 have been inserted in the gap 13 between the platens 9 and 10 a magnetic pattern on the master magnetic tape 5 can be copied onto the duplicate magnetic tape. The principle underlying this process is that the coercivity of the master magnetic tape is substantially higher than that of the duplicate tape in order to ensure that the recording on the master magnetic tape is not affected by the field produced in the tape 13 by the copying means. Suitably, the coercivity of the master tape is at least $2\frac{1}{2}\times$ as high as that of the duplicate tape. By holding the two tapes in intimate contact with each other inside the gap 13 during passage of the copying element 20 the magnetic pattern is transferred to the duplicate magnetic tape 6 via a contact-printing process.

During the movement through the gap 13 it is important for the signal transfer that under the pressure of the fluid in the fluid-cushion support the two tapes 5 and 6 are brought rapidly in intimate contact with each other by initially expelling the air present between the tapes rapidly and effectively towards the tape edges. It is then also important that as a result of the profile of the platens and the grooves formed therein and as a result of the fluid pressure the tapes move rectilinearly in the gap 13 parallel to the gap sides 9A and 10A.

The signal transfer is obtained by the use of the copying element 20 and the auxiliary element 21. In this respect it is of advantage that the platens 9 and 10 have a comparatively great length and the elements 20 and 21 are arranged at short distances from the exit end of the gap 13. Thus, the tapes 5 and 6 are in contact over a comparatively long path, enabling the air present between the tapes to be expelled effectively. During passage of the copying element it is thus ensured that the tapes 5 and 6 are in intimate contact with one another. Further, this long path over which the tapes are in contact is advantageous for a comparatively small surface loading of the tapes and for minimal disturbances in tape tension.

The use of facing passages 18 and first grooves 16 extending perpendicularly to the grooves 17 ensures a uniform pressure build-up on both sides of the tapes. Important in this respect the V-shaped arrangement of the grooves 16A constituting the expulsion means for expelling air which is initially trapped between the tapes, so that after having passed the entrance ends of the platens the tapes are initially pressed against one another at the center and subsequently to a gradually increasing extent over the entire width, yielding a kind of "ironing-out" effect to expel the air present between the tapes from the center towards the tape edges. It is also important that the distance between the parallel portions of the grooves 16 is smaller than the width of the tapes. Thus, the fluid-cushion support can automatically provide a correction for an asymmetrical path of the tapes 5 and 6 through the gap 13. The grooves 16 and 17 produce a satisfactory and uniform pressure distribution in the air-cushion support in the gap 13, excess air being discharged by the vent grooves 14. To this end the vent grooves 14 have cross-sectional dimensions which are comparatively large relative to the dimensions of the passages 18; however, it is important that the grooves 14 are not too large in order to ensure an adequate pressure in the air-cushion support. It is to be noted that instead of pressurized air an other fluid may be used. The number of passages 18 to be used is adapted to the width of the gap 13, to the length of the platens 9 and 10, and to the physical properties of the tapes. In order to achieve the desired removal of the air between the tapes and to maintain an intimate contact between the tapes, the air pressure in the air-cushion support in the gap 13 can be comparatively low. This is important in order to avoid the production of noise in the copying apparatus in accordance with the invention. Pressing the tapes against each other by means of a fluid has the advantage that temperature effects can be neutralized, because the air supply also has a cooling effect. Moreover, insertion of tapes is simplified. The correct pressure build-up and the correct guidance in the air-cushion support between the platens enable the tapes to be fed rectilinearly between the platens, as is indicated by the arrow 15, the neutral lines of the two tapes coinciding and a mutual displacement of the tapes being substantially excluded. This ensures that even at high speeds of transport of the tapes through the gap 13 no tracking errors occur during copying and the magnetic pattern is transferred most accurately from the master tape to the duplicate tape.

Figure 3:
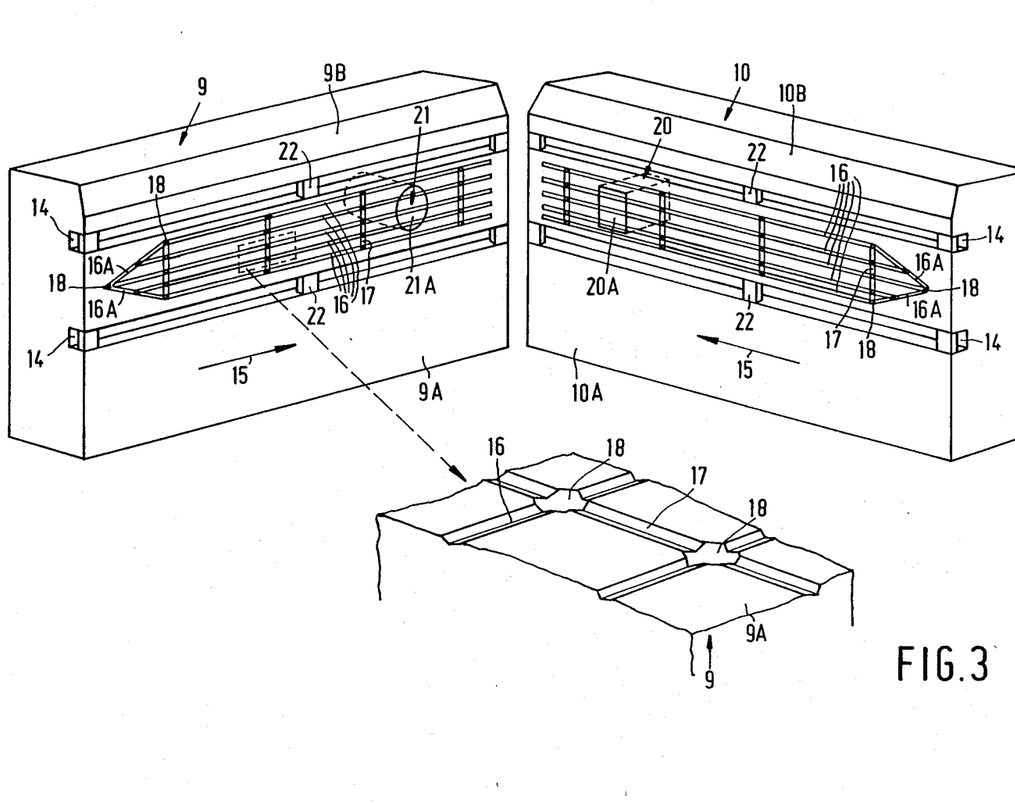
FIG. 3 is in a perspective view similar to FIG. 2, showing second embodiment of a copying apparatus.

FIG. 3 shows a second embodiment comprising two platens 9 and 10 forming part of the copying apparatus 1 in accordance with the invention, corresponding parts bearing the same reference numerals. A difference is that now more mutually parallel first grooves 16 are provided. In the present example five mutually parallel grooves 16 are provided, but different numbers of grooves 16 are also possible. The use of more grooves 16 situated within the width of the tapes can provide an even better and uniform pressure distribution on both sides of the tapes 5 and 6 in the gap 13. A passage 18 is formed at every junction between a groove 16 and a groove 17. In the present embodiment the grooves 16 extend parallel to one another into the area near the entrance end of the platen and adjoin the expulsion means already described for the preceding embodiment, which means comprise the grooves 16A which converge towards one another in a V-shape. Moreover, the grooves 16 are continued in the end walls 20A and 21A, which end walls form part of a cover of the copying element 20 and the auxiliary element 21, the grooves at this location being disposed in line with the grooves 16 and having a corresponding depth. Thus, said end walls 20A and 21A do not form local interruptions and do not affect the uniformity of the pressure build-up in the air-cushion support.

In the present embodiment bridge portions 22 are arranged across the vent grooves 14, which portions locally bridge said grooves 14 and adjoin the adjacent surface of the gap side 9A and 10A, respectively. These bridge portions 22 facilitate insertion of the tapes 5 and 6 into the gap 13 from the top, the presence of the bridge portions ensuring that the tapes cannot enter the vent grooves.

Figure 4A:
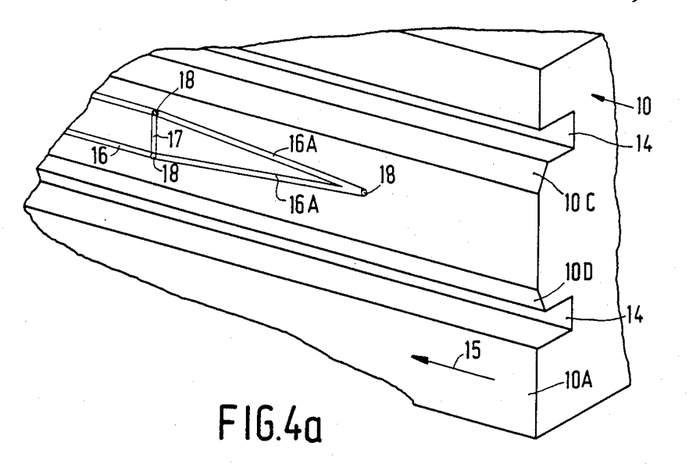
FIGS. 4a, 4b, 4c and 4d are enlarged-scale perspective views of platen end-portions adjoining the entrance side in further embodiments of the copying apparatus in accordance with the invention.
Figure 4B:
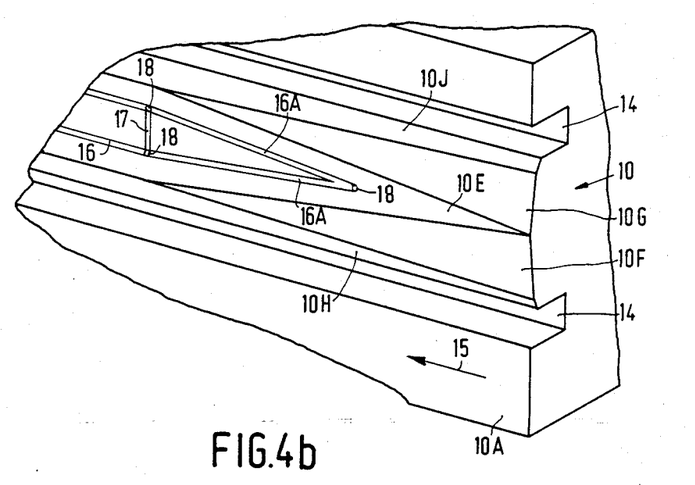
Figure 4C:
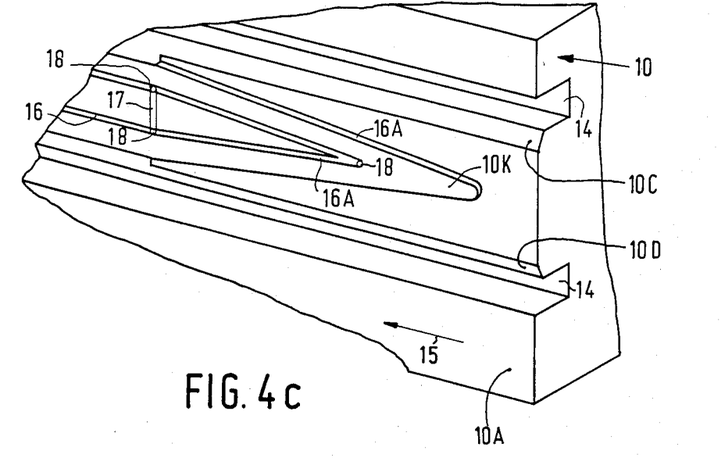

FIGS. 4a, 4b, 4c and 4d show how, as an alternative, the gap side 10A of the platen 10, may be profiled additionally near the entrance end. In the embodiment shown in FIG. 4a bevelled edges 10C and 10D adjoin the adjacent vent groove 14, which edges can provide a favourable pressure build-up during entry of the tapes into the gap 13 and a satisfactory discharge of air to the grooves 14. The platen 9 is provided with a corresponding profile. FIG. 4b shows that the gap side of the platen 10 comprises a main surface 10E, which is V-shaped towards the entrance end and which main surface is adjoined by symmetrically arranged surfaces 10F and 10G which extend in a V-shape in the direction indicated by the arrow 15. The last-mentioned surfaces adjoin bevelled edges 10H and 10J, which are similar to the edges 10C and 10D. As a result of the V-shaped raised profile the present embodiment enhances said "ironing-out" effect, namely directly near the entrance end of the platens 9 and 10. Thus, the V-shaped profile also forms part of said expulsion means for expelling the air present between the tapes from the center towards the tape edges. Instead of the embodiment shown in FIG. 4b other V-shaped profiles of the end portion may also provide said "ironing-out" effect. An example of this is shown in FIG. 4c. Such a raised profile 10E as shown in FIG. 4b and 10K as shown in FIG. 4c can be realised easily by grinding away the adjoining portions of the gap sides of the platens and is of particular advantage at higher speeds of transport of the tapes between the platens 9 and 10.

Figure 4D:
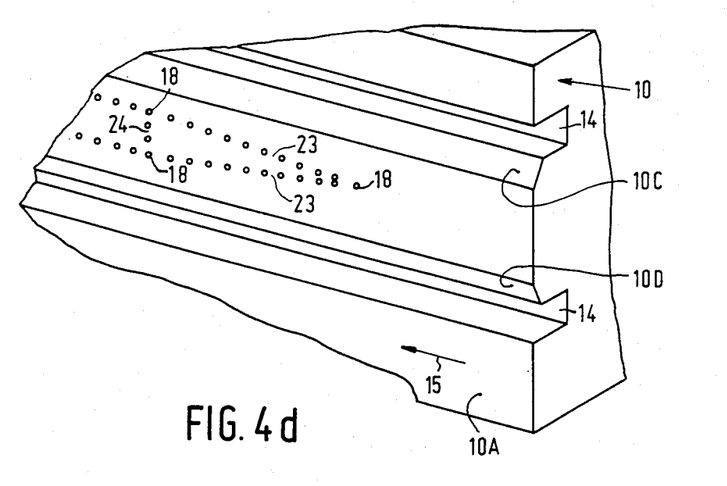

FIG. 4d shows how within the outline of the profile 10K two rows 23 of comparatively closely spaced passages 18 converge to form a V-shaped arrangement. These rows 23 now perform the function of the grooves 16A and thus form part of the expulsion means for expelling air trapped between the tapes. As shown partly in FIG. 4d, the rows 23 of apertures 18 may be extended towards the exit end, to replace the grooves 16 and, in addition, transverse rows 24 of passages may be provided to replace the grooves 17.

Figure 5:
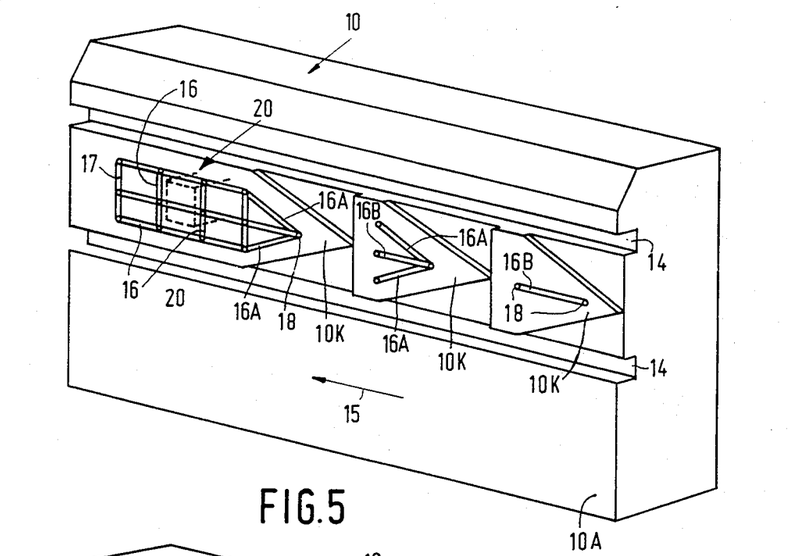
FIG. 5 is a perspective view of a platen used in a further embodiment.

FIG. 5 shows an embodiment comprising three expulsion means each having a profile 10K and arranged in V-shape. In the first profile 10K near the exit end a groove 16B is situated, which groove extends within the outline of the profile parallel to the arrow 15 and comprises passages 18. The second profile 10K comprises both the grooves 16A of the preceding embodiments and the groove 16B within the outline. The third profile 10K adjoins the remainder of the gap side of the platen and has a groove pattern corresponding to that of FIG. 2, but in a shortened version.

In the construction shown in FIG. 5 the pressure gradient in the first profile 10K of each platen is less steep than in the second profile. This provides an even more effective expulsion of air present between the tapes.

Figure 6:
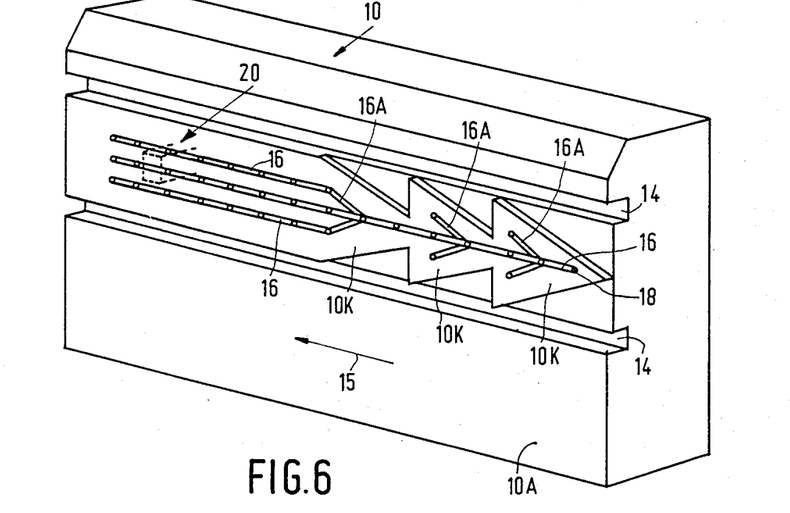
FIG. 6 is a perspective view of another platen used in a further embodiment.

The embodiment shown in FIG. 6 has the same principles as that shown in FIG. 5, the groove 16 being continued in the three profiles 10K. This ensures that a pressure gradient is sustained throughout the gap. Moreover, the platen can have a comparatively short length.

It is to be noted that by the use of a plurality of V-shaped profiles arranged after one another it is possible to reduce the number of passages 18 in the platen at a comparatively high tape speed. It is also possible to use different numbers of profiles. Moreover, the profiles 10K may be arranged slightly asymmetrically relative to the center of the platen.

What is claimed is:

1. A copying apparatus for copying a magnetic pattern from a master magnetic tape on a duplicate magnetic tape, comprising: two facing elongate platens having facing substantially parallel sides between which a gap having an entrance end and an exit end is situated and having at least one row of passages in the gap sides of the two platens; transport means adapted to move the master magnetic tape and the duplicate magnetic tape through the gap in the longitudinal direction of the platens; pressure means adapted to press the master magnetic tape and the duplicate magnetic tape against one another in the gap, by means of a pressurized fluid fed from the passages in the platens adjacent the two tapes into the gap, expulsion means in the gap sides of the platens to expel the air present between the tapes, the expulsion means in each gap side including at least one V-shape profile that is raised relative to the adjoining portions of the gap side and disposed between the entrance end of the gap and the copying means, the axis of symmetry of said V-shape extending substantially parallel to the longitudinal direction of the platens, at least a plurality of the passages being situated within the outline of the V-shape, and a groove disposed in the raised profile extending in the longitudinal direction of the platen and having a bottom in which at least one of said passages terminate, which expulsions means ensure that as the tapes move through the gap the air initially present between the tapes is expelled at least substantially towards the tape edges in order to bring the tapes inside the gap in intimate contact with each other.

2. A copying apparatus as claimed in claim 1 wherein said groove extends across V-shapes which are situated after one another.

3. A copying apparatus as claimed in claim 2 wherein said groove (16) forms part of a plurality of first grooves (16) which, like said V-shape, are situated within an area of the gap side, which area has a width smaller than the width of the tape, mutually spaced passages terminating in the bottoms over the entire length of the first grooves and the passages (18) in the gap sides being arranged in facing pairs.

4. A copying apparatus as claimed in claim 3, characterized in that second grooves (17) are formed in each gap side and extends substantially perpendicularly to the first grooves (16), passages (18) being situated at the junctions between the first and the second grooves.

5. A copying apparatus as claimed in claim 3, comprising a copying element (20) which has one end face terminating in the gap side (10A) of one of the platens (9, 10), characterized in that said end face of the copying element is situated in the gap side of one of the platens in such a way that the bounding edges of said end face are spaced at substantially equal distances from the respective adjacent first grooves (16).

6. A copying apparatus as claimed in claim 5, characterized in that the end face of the copying element comprises an end wall (20A) with grooves (16) adjoining the grooves (16) in the associated platen (10).

7. A copying apparatus as claimed in claim 5, characterized in that the copying means also comprise an auxiliary element (21) terminating in the gap side (9A) of the other platen (9), the end face of said auxiliary element facing the end face of the copying element (20) and comprising an end wall (21A) with grooves (16) adjoining the grooves (16) in the associated platen (9).

8. A copying apparatus as claimed in claim 1 wherein on opposite sides of the gap-side part provided with grooves (16, 17) the gap side (9A, 10A) of each platen (9, 10) is formed with vent grooves (14) which extend parallel to the direction of movement of the tapes (5, 6) through the gap (13).

9. A copying apparatus as claimed in claim 8, characterized in that the platens (9, 10) comprise bridge portions (22) which at least locally bridge the vent grooves (14) and which each adjoin the adjacent surface of the gap side (9A, 10A) of the associated platen.

10. A method for copying a magnetic pattern from a master magnetic tape (5) on a duplicate magnetic tape (6), comprising moving the two tapes (5, 6) through a gap (13) between two elongate platens (9, 10), supplying a fluid from passages (18) in the platens (9, 10) to press the tapes against each other, and transferring the magnetic pattern from the master magnetic tape (5) to the duplicate magnetic tape (6), characterized in that the tapes are pressed against each other immediately after entering the gap (13) substantially only at the center and subsequently to a gradually increasing extent, across the entire width, so that during the movement through the gap (13) air present between the tapes (5, 6) is pressed at least substantially towards the tape edges and is expelled.

11. A copying apparatus for copying a magnetic pattern from a master magnetic tape on a duplicate magnetic tape, comprising:
two facing elongate platens having facing substantially parallel sides between which a gap is formed having an entrance end and an exit end and having at least first and second rows of passages in facing gap sides of the two platens said rows converging into a V-shape towards said entrance end, the axis of symmetry of said V-shape extending substantially parallel to the longitudinal direction of the platens;
transport means adapted to move the master magnetic tape and the duplicate magnetic tape through the gap in the longitudinal direction of the platens;
pressure means adapted to press the master magnetic tape and the duplicate magnetic tape against one another in the gap, by means of a pressurized fluid fed from the passages in the platens adjacent the two tapes into the gap, to ensure that as the tapes move through the gap the air initially present between the tapes is expelled at least substantially towards the tape edges in order to bring the tapes inside the gap in intimate contact with each other.

12. A copying apparatus for copying a magnetic pattern from a master magnetic tape on a duplicate magnetic tape, comprising:
two facing elongate platens having facing substantially parallel sides between which a gap having an entrance end and an exit end is situated and having at least first and second rows of passages in the gap sides of the two platens said rows converging into a V-shape towards said entrance end, the axis of symmetry of said V-shape extending substantially parallel to the longitudinal direction of the platens;
transport means adapted to move the master magnetic tape and the duplicate magnetic tape through the gap in the longitudinal direction of the platens;
pressure means adapted to press the master magnetic tape and the duplicate magnetic tape against one another in the gap, by means of which a pressurized fluid is fed from the passages and a plurality of V-shaped expulsion means arranged one after another in a longitudinal direction in the gap sides of the platens to expel the air present between the tapes, the axis of symmetry of said V-shaped expulsion means extending substantially parallel to the longitudinal direction of the platens, at least a plurality of the passages being situated within the outline of at least one of V-shaped expulsion means, which expulsion means ensure that as the tapes move through the gap the air initially present between the tapes is expelled at least substantially towards the tape edges in order to bring the tapes inside the gap in intimate contact with each other.

* * * * *